United States Patent
Ahn et al.

(10) Patent No.: US 10,433,266 B2
(45) Date of Patent: *Oct. 1, 2019

(54) CONTROLLING POWER IN NON-LICENSED BAND

(71) Applicant: LG ELECTRONICS INC., Seoul (KR)

(72) Inventors: Joonkui Ahn, Seoul (KR); Byounghoon Kim, Seoul (KR); Suckchel Yang, Seoul (KR); Hanbyul Seo, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/027,196

(22) Filed: Jul. 3, 2018

(65) Prior Publication Data

US 2018/0317183 A1    Nov. 1, 2018

Related U.S. Application Data

(63) Continuation of application No. 15/809,964, filed on Nov. 10, 2017, now Pat. No. 10,045,313, which is a
(Continued)

(51) Int. Cl.
*H04W 72/12* (2009.01)
*H04W 52/04* (2009.01)
(Continued)

(52) U.S. Cl.
CPC ....... *H04W 52/365* (2013.01); *H04W 52/146* (2013.01); *H04W 52/34* (2013.01); *H04W 52/38* (2013.01); *H04W 72/0446* (2013.01)

(58) Field of Classification Search
CPC . H04W 16/14; H04W 72/0453; H04B 7/2612
See application file for complete search history.

(56) References Cited

U.S. PATENT DOCUMENTS 9,585,103 B2 *   2/2017   Chen .................... H04W 52/18
9,655,064 B2 *   5/2017   Ahn ..................... H04W 52/34
(Continued)

FOREIGN PATENT DOCUMENTS

CN    102123437    7/2011
CN    103069870    4/2013
(Continued)

OTHER PUBLICATIONS

PCT International Application No. PCT/KR2015/004848, Written Opinion of the International Searching Authority dated Aug. 25, 2015, 2 pages.
(Continued)

*Primary Examiner* — Bobbak Safaipour
(74) *Attorney, Agent, or Firm* — Lee, Hong, Degerman, Kang & Waimey (57) ABSTRACT

Provided are a method and an apparatus for controlling transmission power in a wireless communication system. A wireless device is connected to a first serving cell utilizing a licensed band and a second serving cell utilizing a non-licensed band. The transmission power from the second serving cell is determined by considering the clear channel assessment (CCA) coverage of the wireless device or the second serving cell.

8 Claims, 5 Drawing Sheets

Related U.S. Application Data continuation of application No. 15/492,534, filed on Apr. 20, 2017, now Pat. No. 9,838,983, which is a continuation of application No. 15/310,708, filed as application No. PCT/KR2015/004848 on May 14, 2015, now Pat. No. 9,655,064.

(60) Provisional application No. 62/156,831, filed on May 4, 2015, provisional application No. 62/106,217, filed on Jan. 22, 2015, provisional application No. 61/993,280, filed on May 15, 2014.

(51) Int. Cl.
| | | |
|---|---|---|
| *H04W 52/36* | (2009.01) | |
| *H04W 52/34* | (2009.01) | |
| *H04W 52/38* | (2009.01) | |
| *H04W 72/04* | (2009.01) | |
| *H04W 52/14* | (2009.01) | |

(56) References Cited

U.S. PATENT DOCUMENTS

| | | | | |
|---|---|---|---|---|
| 9,680,682 | B2* | 6/2017 | Kim | H04L 27/2663 |
| 9,838,983 | B2* | 12/2017 | Ahn | H04W 52/34 |
| 9,848,424 | B2* | 12/2017 | Wang | H04W 72/0446 |
| 10,045,313 | B2* | 8/2018 | Ahn | H04W 52/34 |
| 10,098,075 | B2* | 10/2018 | Wang | H04W 52/06 |
| 2007/0037603 | A1 | 2/2007 | Dravida et al. | |
| 2013/0016635 | A1 | 1/2013 | Linsky et al. | |
| 2013/0165134 | A1 | 6/2013 | Touag et al. | |
| 2014/0329553 | A1* | 11/2014 | Nakashima | H04W 52/365 455/522 |
| 2015/0215874 | A1* | 7/2015 | Chen | H04W 52/18 455/522 |
| 2015/0245376 | A1* | 8/2015 | Bashar | H04L 1/18 370/277 |
| 2016/0135143 | A1* | 5/2016 | Won | H04W 72/005 370/312 |
| 2016/0330676 | A1* | 11/2016 | Thangarasa | H04W 76/14 |
| 2016/0338053 | A1* | 11/2016 | Park | H04W 74/0808 |
| 2016/0345326 | A1* | 11/2016 | Yerramalli | H04W 72/0453 |
| 2016/0360553 | A1* | 12/2016 | Cheng | H04W 16/14 |
| 2016/0366689 | A1* | 12/2016 | Zhang | H04L 5/0091 |
| 2017/0006583 | A1* | 1/2017 | Tavildar | H04B 7/2615 |
| 2017/0078983 | A1* | 3/2017 | Ahn | H04W 52/34 |
| 2017/0150514 | A1* | 5/2017 | Li | H04W 16/14 |
| 2017/0223643 | A1 | 8/2017 | Ahn et al. | |
| 2018/0048498 | A1* | 2/2018 | Stern-Berkowitz | H04L 5/0048 |
| 2018/0070322 | A1 | 3/2018 | Ahn et al. | |
| 2018/0175975 | A1* | 6/2018 | Um | H04L 1/1816 |

FOREIGN PATENT DOCUMENTS

| | | |
|---|---|---|
| CN | 103765824 | 4/2014 |
| KR | 1020080040753 | 5/2008 |
| KR | 1020080066345 | 7/2008 |
| KR | 1020130018101 | 2/2013 |
| KR | 1020140035506 | 3/2014 |
| WO | 2012109960 | 8/2012 |
| WO | 2013025026 | 2/2013 |
| WO | 2013141558 | 9/2013 |
| WO | 2014018333 | 1/2014 |

OTHER PUBLICATIONS

United States Patent and Trademark Office U.S. Appl. No. 15/492,534, Notice of Allowance dated Nov. 3, 2017, 6 pages.

United States Patent and Trademark Office U.S. Appl. No. 15/492,534, Office Action dated May 18, 2017, 16 pages.

United States Patent and Trademark Office U.S. Appl. No. 15/310,708, Notice of Allowance dated Apr. 13, 2017, 13 pages.

United States Patent and Trademark Office U.S. Appl. No. 15/809,964, Notice of Allowance dated Apr. 3, 2018, 7 pages.

Japan Patent Office Application Serial No. 2016-567843, Office Action dated Jan. 23, 2018, 4 pages.

AT&T, "Drivers, Benefits and Challenges for LTE in Unlicensed Spectrum," 3GPP TSG-RAN WG1 #62, RP-131701, Dec. 2013, 3 pages.

European Patent Office Application Serial No. 15792436.6, Search Report dated Oct. 26, 2017, 6 pages.

The State Intellectual Property Office of the People's Republic of China Application Serial No. 201580025768.7, Office Action dated Nov. 22, 2018, 5 pages.

Japan Patent Office Application No. 2018-165721, Office Action dated Jun. 25, 2019, 3 pages.

Interdigital, "Power headroom reporting in dual connectivity", 3GPP TSG RAN WG1 Meeting #77, R1-142348, May 2014, 5 pages.

Ericsson, et al., "Study on Licensed-Assisted Access Using LTE", 3GPP TSG RAN Meeting #63, RP-140260, Mar. 2014, 9 pages.

Dualcomm, et al., "Introducing LTE in Unlicensed Spectrum", 3GPP TSG RAN Meeting #62, RP-131635, Dec. 2013, 9 pages.

* cited by examiner

CONTROLLING POWER IN NON-LICENSED BAND

CROSS-REFERENCE TO RELATED APPLICATIONS

This application is a continuation of U.S. patent application Ser. No. 15/809,964, filed on Nov. 10, 2017, now U.S. Pat. No. 10,045,313, which is a continuation of U.S. patent application Ser. No. 15/492,534, filed on Apr. 20, 2017, now U.S. Pat. No. 9,838,983, which is a continuation of U.S. patent application Ser. No. 15/310,708, filed on Nov. 11, 2016, now U.S. Pat. No. 9,655,064, which is the National Stage filing under 35 U.S.C. 371 of International Application No. PCT/KR2015/004848, filed on May 14, 2015, which claims the benefit of U.S. Provisional Application No. 61/993,280, filed on May 15, 2014, 62/106,217, filed on Jan. 22, 2015, and 62/156,831, filed on May 4, 2015, the contents of which are all hereby incorporated by reference herein in their entirety.

BACKGROUND OF THE INVENTION

Field of the Invention

The present invention relates to wireless communication, and more particularly, to a method and apparatus for controlling transmit power in a wireless communication system.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, power control based on the legacy LTE may cause an interference with respect to another radio access technique.

SUMMARY OF THE INVENTION

The present invention provides a method and device for controlling transmit power in an unlicensed band.

The present invention also provides a method and device for reporting a power headroom in an unlicensed band.

In an aspect, a method for controlling transmit power in a wireless communication system is provided. The method includes establishing, by a wireless device, a connection with a first serving cell operating in a licensed band, activating, by the wireless device, a second serving cell operating in an unlicensed band by an instruction from the first serving cell, and determining a transmit power of the second serving cell in consideration of a clear channel assessment (CCA) coverage of the wireless device or the second serving cell.

In another aspect, a device for controlling a transmit power is provided.

An interference can be reduced in an environment in which various communication protocols co-exist in an unlicensed band.

DESCRIPTION OF EXEMPLARY EMBODIMENTS

A wireless device may be fixed or mobile, and may be referred to as another terminology, such as a user equipment (UE), a mobile station (MS), a mobile terminal (MT) a user terminal (UT), a subscriber station (SS), a personal digital assistant (PDA), a wireless modem, a handheld device, etc. Alternatively, the wireless device may be a device supporting a data communication such as a machine-type communication (MTC) device.

A base station (BS) is generally a fixed station that communicates with the wireless device and may be referred to as another terminology, such as an evolved-nodeB (eNB), a base transceiver system (BTS), an access point, etc.

Hereinafter, the present invention is applied based on a 3rd generation partnership project (3GPP) long term evolution (LTE) according to 3GPP technical specification (TS). This is for exemplary purposes only, and thus the present invention is applicable to various communication systems.

In 3GPP LTE, scheduling is performed in unit of subframes. For example, one subframe has a length of 1 ms, which is called a transmission time interval (TTI). A radio frame may include 10 subframes, and one subframe may include two consecutive slots. The subframe may include a plurality of orthogonal frequency division multiplexing (OFDM) symbols. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc. According to 3GPP LTE, in case of a normal cyclic prefix (CP), one subframe includes 14 OFDM symbols, and in case of an extended CP, one subframe includes 12 OFDM symbols.

A physical channel of the 3GPP LTE may be classified into a downlink (DL) physical channel and an uplink (UL) physical channel. The DL physical channel includes a physical downlink control channel (PDCCH), a physical control format indicator channel (PCFICH), and a physical hybrid-ARQ indicator channel (PHICH). The UL physical channel includes a physical uplink control channel (PUCCH) and a physical uplink shared channel (PUSCH).

A wireless device may be served by a plurality of serving cells in a carrier aggregation (CA) environment or a dual connectivity environment. Each serving cell may be defined by a downlink (DL) component carrier (CC) or a pair of a DL CC and an uplink (UL) CC.

A serving cell may be classified into a primary cell and a secondary cell. The primary cell operates at a primary frequency, and performs an initial connection establishment procedure or initiates a connection reestablishment procedure, or is a cell designated as a primary cell during a handover. The primary cell may be referred to as a reference cell. The secondary cell operates at a secondary frequency and is configured after establishing a radio resource control (RRC) connection. The secondary cell is used to provide additional radio resources. At least one primary cell is always configured but the secondary cell may be added/modified/released by upper layer signaling (e.g. RRC message). A cell index (CI) of the primary cell may be fixed. For example, a lowest CI may be set as the CI of the primary cell. Hereinafter, the CI of the primary cell is set to zero, and the CI of a secondary cell may be assigned subsequently starting from one.

Figure 1:
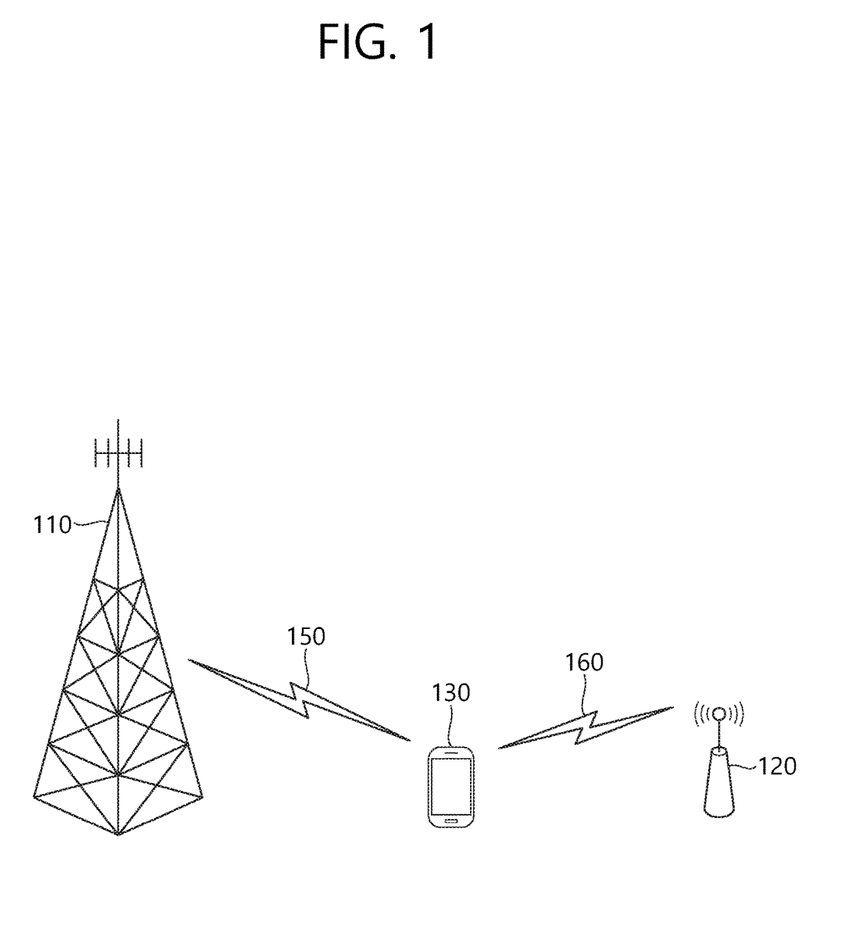
FIG. 1 shows an example of a long term evolution (LTE) service using an unlicensed band.

FIG. 1 shows an example of an LTE service using an unlicensed band.

A wireless device 130 receive a service from a 1$^{st}$ BS 110 through a licensed band. For traffic offloading, the wireless device 130 may receive a service from a 2$^{nd}$ BS 120 through an unlicensed band.

The 1$^{st}$ BS 110 is a BS supporting an LTE system, whereas the 2$^{nd}$ BS 120 may also support other communication protocols such as a wireless local area network (WLAN) in addition to LTE. The 1$^{st}$ BS 110 and the 2$^{nd}$ BS 120 may be associated with a carrier aggregation (CA) environment, and a specific cell of the 1$^{st}$ BS 110 may be a primary cell. Alternatively, the 1$^{st}$ BS 110 and the 2$^{nd}$ BS 120 may be associated with a dual connectivity environment, and a specific cell of the 1$^{st}$ BS 110 may be a primary cell. In general, the 1$^{st}$ BS 110 having the primary cell has wider coverage than the 2$^{nd}$ BS 120. The 1$^{st}$ BS 110 may be called a macro cell. The 2$^{nd}$ BS 120 may be called a small cell, a femto cell, or a micro cell.

When the wireless device 130 is connected to the primary cell of the 1$^{st}$ BS 110 and the secondary cell of the 2$^{nd}$ BS 120, transmit power related information described below may be given by signaling of the primary cell. A power headroom report described below may be transmitted in the primary cell or the secondary cell, The secondary cell may be activated/deactivated by an instruction of the primary cell.

The licensed band is a band in which an exclusive use is guaranteed to a specific communication protocol or a specific provider.

The unlicensed band is a band in which various communication protocols coexist and a shared use is guaranteed. It is assumed in the unlicensed band that a channel is occupied basically through contention between respective communication nodes. Therefore, in communication in the unlicensed band, it is required to perform channel sensing to confirm that other communication nodes do not transmit signals. This is called a clear channel assessment (CCA). The unlicensed band may include 2.5 GHz and/or 5 GHz band used in a WLAN.

The CCA must be performed preferentially in order for a BS or wireless device of an LTE system to have access to a channel in an unlicensed band. Further, when the BS or wireless device of the LTE system transmits a signal, an interference problem may occur since other communication nodes such as the WLAN or the like also perform the CCA. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Figure 2:
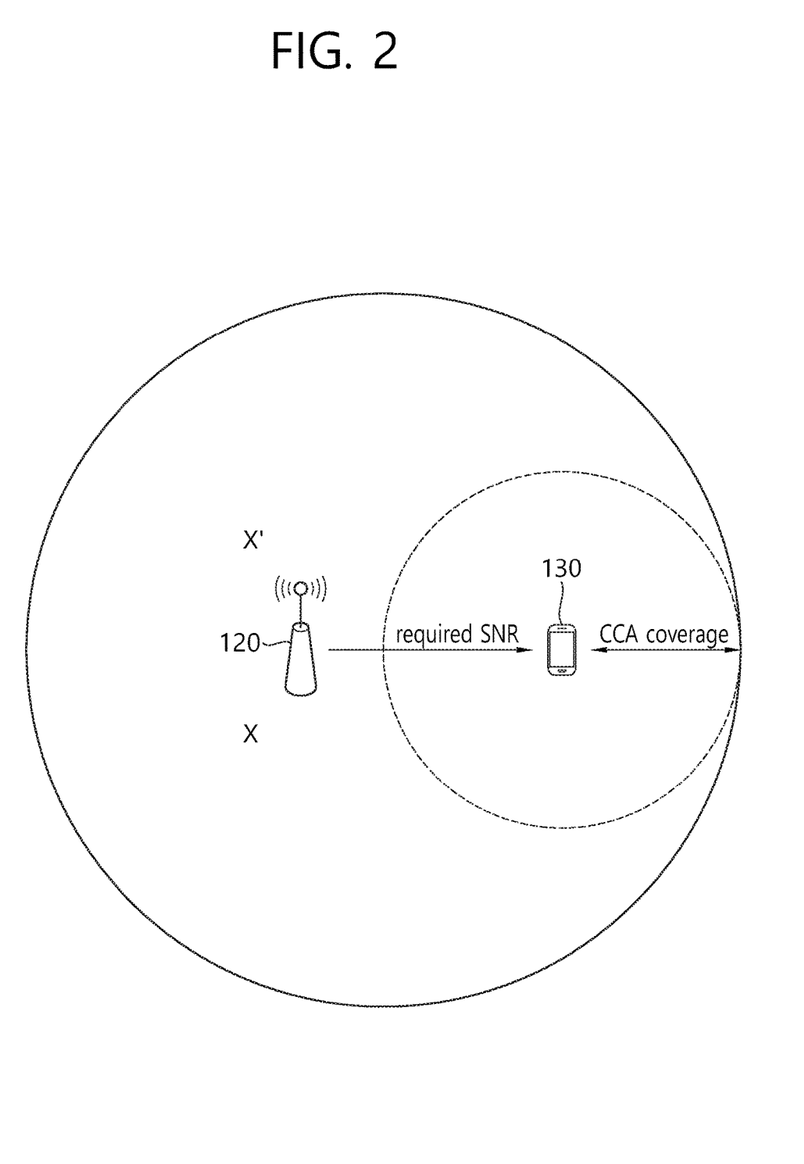
FIG. 2 shows an example of power control.

FIG. 2 shows an example of power control.

In the legacy LTE system, transmit power between a BS and a wireless device may be set to satisfy a signal-to-noise ratio (SNR) required in a receiving end or may be set to minimum power satisfying required reception performance. When such a transmit power control is directly applied to LTE-U, an interference may be caused since reception is made to other communication nodes with power less than a CCA threshold.

When a BS 120 transmits a DL signal to a wireless device 130, it is assumed that 'X' denotes transmit power satisfying an SNR required in the wireless device 130. It is assumed that 'Y' denotes a CCA threshold sensed by other communication nodes in a CCA coverage with respect to the wireless device 130. When the BS 120 transmits the DL signal to the wireless device 130, it is assumed that 'X'' denotes transmit power satisfying the CCA threshold Y in the CCA coverage. That is, transmit power X' greater than X may be necessary in order for the DL signal to be received with power greater than or equal to the CCA threshold Y so that another communication node does not transmit a signal which acts as an interference.

Although the CCA coverage is assumed with respect to a receiver in the above example, the CCA coverage may be assumed with respect to a transmitter, and X' may denote transmit power satisfying this.

Hereinafter, a method of controlling transmit power of a communication node is proposed in LTE in unlicensed spectrum (LTE-U) in which a primary cell uses a licensed band and a secondary cell uses an unlicensed band.

First, an LTE signal may be classified into a fixed band signal and a variable band signal. The fixed band signal is a signal transmitted in a fixed band within a subframe, and may include a reference signal, a synchronization signal, a PBCH, or the like. The variable band signal is a signal transmitted in a variable band within the subframe, and may include a data channel such as a PDSCH and a PUSCH. Information regarding a band in which the variable band signal is transmitted is reported dynamically by the BS to the wireless device.

Transmit Power Control of Fixed Band Signal

If total transmit power does not exceed X' in an OFDM symbol in which a fixed band signal is transmitted, other nodes may not detect a presence of a corresponding signal and may use a corresponding channel. Therefore, a BS needs to adjust transmit power such that the total transmit power is greater than or equal to X' in the OFDM symbol.

It is assumed that P2 denotes transmit power of the fixed band signal, and P2 denotes transmit power of another signal transmitted in a corresponding OFDM symbol. Although P1+P2 is greater than or equal to X', P1 may be less than X'. Taking a cell specific reference signal (CRS) of LTE for example, transmit power of the CRS is identical in every subframe. When a PDSCH and the CRS are transmitted together in the OFDM symbol, a transmit power sum of the CRS and the PDSCH is constant in a normal operation. However, if transmit power of the CRS is maintained to be the same in an unlicensed band, even if total transmit power is greater than or equal to X' in an OFDM symbol in which the PDSCH is transmitted, when using only CRS transmit power, it may be less than X' in an OFDM symbol in which the PDSCH is not transmitted.

Accordingly, the following methods are proposed.

In a first embodiment, transmit power of a fixed band signal may be set differently according to transmission of a different signal in a corresponding OFDM symbol.

In an OFDM symbol in which only the fixed band signal is transmitted, transmit power of the fixed band signal is set to be greater than or equal to X'. In an OFDM symbol in which the fixed band signal is transmitted together with a different signal, the transmit power of the fixed band signal is set such that total transmit power of the fixed band signal and the different signal is greater than or equal to X'.

The transmit power of the fixed band signal may be set according to a transmission band of the different signal. The transmit power of the fixed band signal may be set such that the wider the transmission band of the different signal, the lower the transmit power is.

A BS may provide information regarding a change in the transmit power of the fixed band signal to a wireless device.

CRS transmission is assumed. The BS may report information regarding transmit power of the CRS to the wireless device so that the wireless device estimates a path loss and persistently observes quality of DL reception. The transmit power of the CRS may be specified as power assuming a case where a PDSCH of a specific bandwidth and a different signal are present or absent. If the transmit power of the CRS is changed using a predetermined rule according to whether the PDSCH and the different signal are present, the wireless device may estimate the changed power of the CRS by using the rule. The rule for calculating the transmit power of the CRS may include whether the PDSCH is transmitted in a subframe in which the CRS is transmitted, a transmit power offset of the CRS depending on a PDSCH transmission bandwidth, and an offset against reference transmit power. The rule may be predetermined, or may be transmitted through a medium access control (MAC) message or a radio resource control (RRC) message. Information regarding the rule may be transmitted in a primary cell.

The wireless device does not know a PDSCH transmission bandwidth and whether there is a PDSCH to be transmitted to a different device other than a PDSCH transmitted to the wireless device. Accordingly, transmit power of a fixed band signal transmitted through a corresponding subframe or an offset value against reference transmit power may be reported by using the PDCCH or a different physical channel. The PDCCH may be transmitted in the primary cell. The reference transmit power may include transmit power for a case where only a fixed band signal is transmitted or transmit power for a case where the signal is transmitted by being specifically combined with a different signal.

In a second embodiment, in an OFDM symbol in which a fixed band signal is transmitted, a correction signal is transmitted together so that total transmit power is greater than or equal to X'.

If transmit power of only the fixed band signal is not greater than or equal to X', the correction signal is transmitted together so that total transmit power is greater than or equal to X' in a corresponding OFDM symbol. Taking a CRS for example, when transmit power of the CRS is not greater than or equal to X', the correction signal (e.g., PDSCH or any signal) is transmitted together in a corresponding subframe or a corresponding OFDM symbol, so that total transmit power is not greater than or equal to X'.

The correction signal may include a pre-defined sequence. The correction signal may be transmitted in a band other than a band in which the fixed band signal is transmitted.

For example, a correction signal sequence r(m) may be defined as follows.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 1]}$$

Herein, m=0, 1, . . . , $2N_{BB}-1$, and $N_{BB}$ is a bandwidth in which a correction signal is transmitted. A pseudo-random sequence c(i) may be defined by a gold sequence as follows.

$$c(n)=(x_1(n+NC)+x_2(n+Nc)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 2]}$$

Herein, Nc is integer, n=0, . . . , Ns−1, Ns denotes a sequence length, and 'mod' denotes a modulo operation. A first m-sequence is initialized as $x_1(0)=1$, $x_1(n)=0$, m=1, 2, . . . , 30. A second m-sequence is initialized based on an index of a correction signal sequence, an unlicensed band in which a correction signal is transmitted, or an index of a cell in which the correction signal is required.

Since a UE knows in advance transmission of the correction signal sequence, the sequence may be used in frequency synchronization estimation, time synchronization estimation, DL quality measurement, or the like.

The correction signal may be implemented in such a manner that the number of resource elements (REs) in which a CRS is transmitted is increased or an RS (e.g., a positioning reference signal (PRS)) of a different sequence/pattern is added in a specific unit time-frequency resource.

The first and second embodiments may also be applied to a signal in device-to-device transmission such as a discovery reference signal (DRS) in addition to a fixed band signal.

Transmit Power Control of Variable Band Signal

In an LTE system, a PDSCH/PUSCH may be transmitted with different bandwidths for respective subframes according to scheduling, and this is called a variable band signal.

In a first embodiment, transmit power of the variable band signal may be set to greater power between transmit power X satisfying reception performance required in a receiving end and transmit power X' satisfying receive power for a CCA.

The receiving end may be a BS or a wireless device. An example in which the receiving end is the wireless device is shown in FIG. 2.

Figure 3:
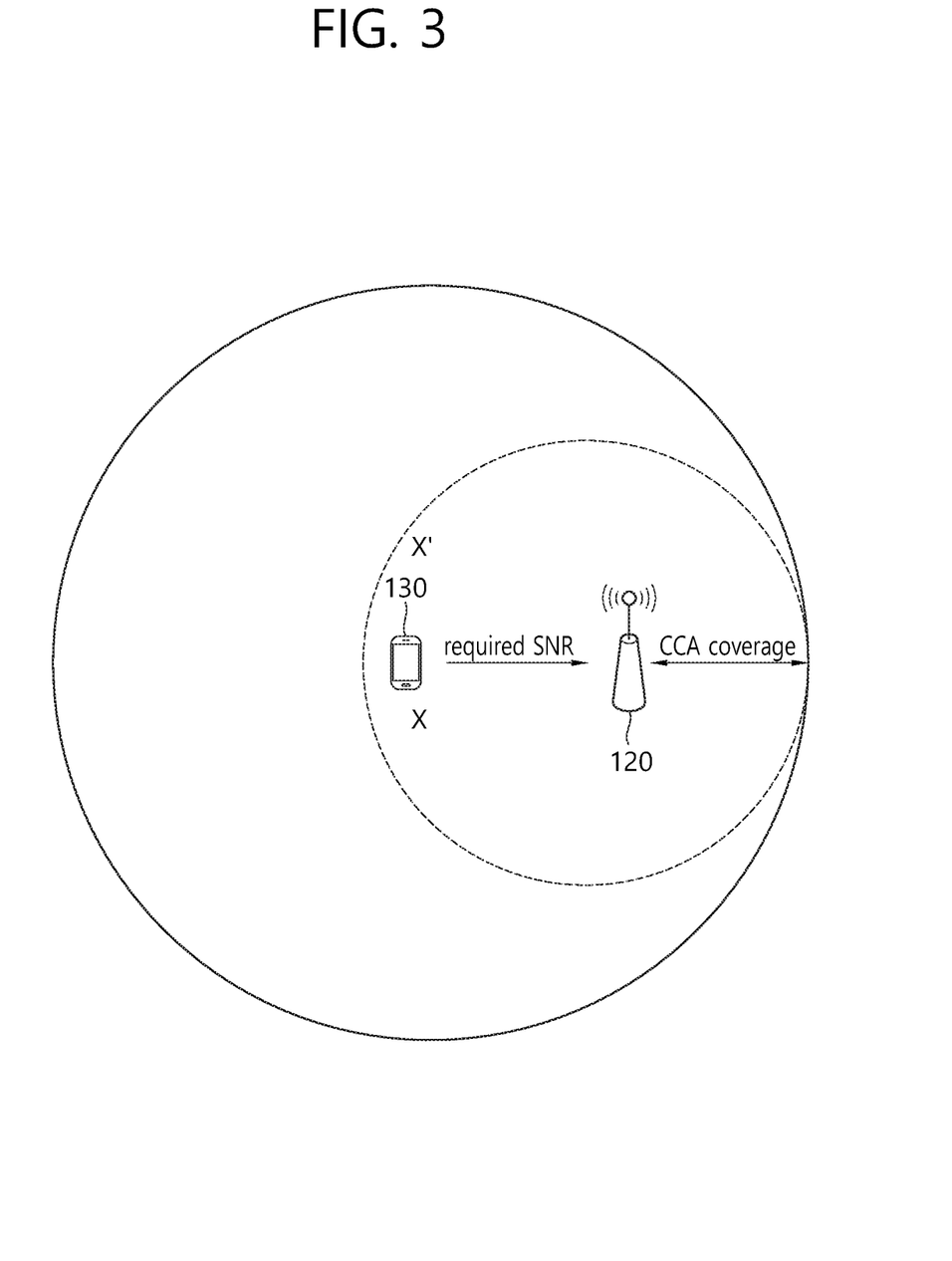
FIG. 3 shows another example of transmit power in an unlicensed band.

FIG. 3 shows another example of transmit power in an unlicensed band. In comparison with FIG. 2, this is a case where a receiving end is the BS 120.

When the wireless device 130 transmits a UL signal to the BS 120, it is assumed that 'X' denotes transmit power satisfying an SNR required in the BS 120. It is assumed that 'Y' denotes a CCA threshold sensed by other communication nodes in a CCA coverage with respect to the BS 120. When the wireless device 130 transmits the UL signal to the BS 120, it is assumed that 'X'' denotes transmit power satisfying the CCA threshold Y in the CCA coverage.

The wireless device may transmit a variable band signal by selecting greater transmit power between X and X'.

If maximum power that can be transmitted by the wireless device in a corresponding cell is less than the greater power between X and X', the wireless device may transmit the variable band signal according to the transmit power, or may discard transmission of the variable band signal.

Next, a method of determining X' is proposed.

In a first method, the wireless device may determine X' through minimum receive power to be received by the BS.

If a path loss characteristic depending on a distance can be recognized in advance when a system is deployed, or if a CCA coverage is configured depending on a path loss, it can be seen that receive power of a signal received by the BS must be greater than or equal to Z in order for the signal to be received with power greater than or equal to a CCA threshold Y within the CCA coverage with respect to the BS. Accordingly, when this value is reported to the wireless device, the wireless device may determine X' such as X'=Z+PL. PL is transmit power considering the path loss. The value Z may be predetermined, or may be reported by the BS to the wireless device through an RRC message or the like.

In a second method, X' may be predetermined. This is a case where it is difficult to know an actual path loss characteristic of a system. The BS may calculate transmit power X' for satisfying a CCA threshold of a device located in a coverage boundary, and may report it to the wireless device through an RRC message or the like.

In a third method, the wireless device may determine X'.

The wireless device may calculate the X' on the basis of a distance '$d_{BS}$' between the wireless device and the BS, a path loss 'PL' towards the BS, and a CCA coverage '$d_{CCA}$'. For example, a path loss from the wireless device to a farthest CCA coverage point via the BS may be denoted by $A*\log(d_{BS}+d_{CCA})+B$ (where A and B are constants). X' may be obtained to satisfy $Y=X'-A*\log(d_{BS}+d_{CCA})-B$. Y, $d_{CCA}$, A, and B may be predetermined or may be reported by the BS.

The wireless device may calculate X' on the basis of a noise/interference level measured by the wireless device. X' may be in proportion to the measured noise/interference level.

The wireless device may report information regarding the determined X' to the BS.

In the above methods, X may be calculated in consideration of a format (e.g., a modulation scheme, a code rate, a bandwidth, etc.) used when the wireless device transmits the variable band signal, a path loss, a power parameter provided from the BS, or the like.

In the above methods, the UE may transmit a signal with power X' without consideration of X.

In a second embodiment, transmit power of a variable band signal may be controlled in consideration of a power spectral density (PSD).

If the PSD is restricted in an unlicensed band, transmit power X' satisfying a CCA coverage may not be used when the variable band signal is transmitted with a small bandwidth. For example, maximum transmit power per MHz is specified to be less than or equal to 17 dBm in a UNII-3 band specified in a federal communication commission (FCC). In this case, even if transmit power of 17 dBm is applied per MHz, a transmitter (BS or wireless device) may perform transmission by determining a bandwidth of the variable band signal to be greater than or equal to a bandwidth in which total transmit power satisfies the CCA coverage.

If the transmit power X' cannot be used due to the PSD restriction, the wireless device may report this to the BS. Alternatively, the wireless device may report an actual PSD against a maximum PSD on the PSD restriction to the BS. The BS may predict a transmission bandwidth required to ensure the CCA coverage on the basis of received information.

In a third embodiment, transmit power may be configured in consideration of a multiplexed signal. It is assumed that the BS performs multiplexing on a plurality of UL signals to be transmitted by a plurality of wireless devices into one OFDM symbol by using frequency division multiplexing (FDM)/spatial division multiplexing (SDM) or the like. Even if a CCA level based on a UL signal for one wireless device does not exceed a threshold Y, a CCA level based on a plurality of UL signals may exceed the threshold Y. However, since the wireless device does not know that a UL signal of a different wireless device is multiplexed into one OFDM symbol, there may be problem in that transmit power is adjusted by using only a UL signal of the wireless device so that the CCA threshold becomes Y. In order to overcome such a shortcoming, the BS may report offset information for adjusting X' together when a plurality of UL signals are scheduled. The offset information may include information indicating that a UL signal of a different device is multiplexed, a value X', or information regarding an offset for adjusting the value of X'. The offset information may be included in control information on a PDCCH for scheduling a PUSCH. For example, in the control information for scheduling the PUSCH, the offset information may be given such as {0 dB, −3 dB, −6 dB, . . . }. The offset information may be applied to a minimum power value which must be configured by the wireless device to ensure a CCA coverage.

The value X' may be adjusted according to a transmission bandwidth of the UL signal. For example, under the assumption that the BS performs UL scheduling so that a specific bandwidth is always used, the value X' may be adjusted in such a manner that the smaller the bandwidth for transmitting the UL signal by the wireless device, the smaller the value is. The specific bandwidth may be pre-defined, or may be reported by the BS to the wireless device. The offset information may be given as a ratio of the specific bandwidth against an actually scheduled band.

For determining of whether a different system such as a WLAN transmits a signal in an unlicensed band, for setting of a threshold for CCA, and/or for setting of transmit power, the wireless device may measure a reception noise/interference level, and may report this measurement result to the BS.

In the above methods, 'receive power' may be applied by being replaced with a signal-to-interference-plus-noise ratio (SINR) in consideration of a noise and interference in a receiving end.

Feedback of Receiver Considering CCA

In an unlicensed band, transmit power of a transmitter may be adjusted for the purpose of receive power required to ensure a CCA coverage in a receiver. To facilitate a transmit power control of the transmitter, the receiver may compare receive power of a previously or currently received signal with the required receive power, and may feed back a result thereof. The feedback information may include information regarding a difference between the receive power of the previously or currently received signal and the requested receive power and/or an adjustment requirement of the transmit power. The information regarding the required receive power may be pre-defined or may be signaled by a BS.

The feedback information may include information regarding a data format (a modulation scheme, a rank, a precoding matrix indicator (PMI), etc.) capable of satisfying a corresponding reception performance when it is assumed that a receiver receives data according to the required receive power.

The wireless device may report a difference of the required receive power against receive power of a DL RS to the BS. Alternatively, the wireless device may report a channel state to the BS when it is assumed that a PDSCH to which the required receive power is applied is received. Information regarding the required receive power may be pre-defined or may be signaled by the BS. The BS may adjust transmit power and/or modulation and coding scheme (MCS) of the PDSCH on the basis of the reported information.

In the above methods, 'receive power' may be applied by being replaced with an SINR in consideration of a noise and interference in a receiving end.

Power Headroom Report

In LTE, a power headroom report (PHR) is used to provide a BS with a difference between a maximum transmit power Pcmax in a corresponding cell and an estimated transmit power in a UL channel.

Figure 4:
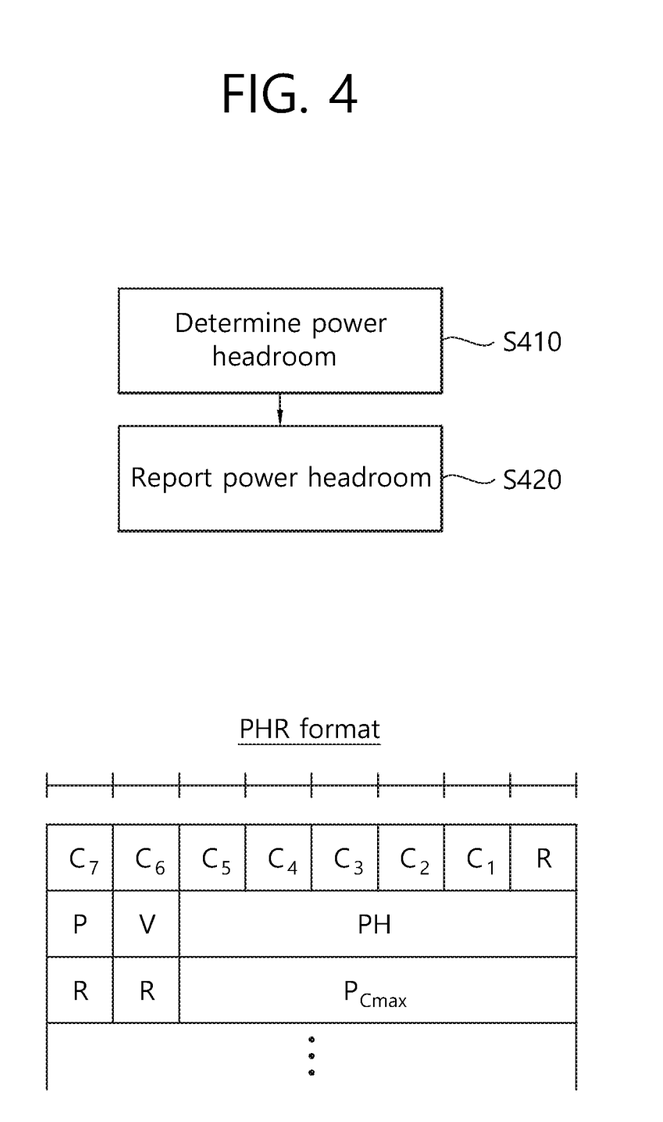
FIG. 4 shows an example of a power headroom report (PHR).

FIG. 4 shows an example of a PHR.

In step S410, a wireless device can determine a power headroom. In step S420, the wireless device can report the power headroom.

An actual power headroom can be calculated based on a power required when the wireless devices transmits a corresponding signal in any cell at an actual transmission time. The actual power headroom can be computed based on scheduling information such as a bandwidth, transmission format, code rate, modulation scheme, or the like used to transmit the corresponding signal.

A virtual power headroom can be calculated based on a power required when a corresponding signal is transmitted at a time at which the signal is not actually transmitted. The virtual power headroom can be calculated by assuming a virtual signal format.

More specifically, the legacy LTE includes a type-1 PHR and a type-2 PHR. The type-1 PHR does not consider PUCCH transmission in a subframe n, and considers only scheduled PUSCH transmission. The type-2 PHR considers both of PUCCH transmission and PUSCH transmission in the subframe n. When a PUCCH is not transmitted or a PUSCH is not transmitted, a virtual PHR calculated by assuming a predetermined basic format may be transmitted for the PUCCH or PUSCH which is not transmitted. The type-2 PHR is valid only in a cell capable of performing PUUCH transmission, that is, a primary cell.

FIG. 4 shows an example of a MAC control element (CE) used in a PHR. Ci indicates whether a power headroom of an $i^{th}$ cell is present. If a Ci-field is '1', it indicates that a PH-field of a cell having an index i is present. A V-field indicates whether it is an actual power headroom or a virtual power headroom. The PH-field indicates a power headroom level. Pcmax indicates maximum transmit power in a corresponding cell and used to calculate the PH-field.

In order for a wireless device to calculate a power headroom for any cell, Pcmax for a corresponding cell needs to be determined. Pcmax in the subframe n is determined according to a PUSCH/PUCCH transmission type of all serving cells configured to the wireless device.

It is assumed that a cell configured in an unlicensed band is a U-cell. Even if the PUSCH/PUCCH is scheduled in the U-cell, whether the wireless device actually transmits the PUSCH/PUCCH depends on a CCA result. That is, the PUSCH/PUCCH transmission is performed when a result of performing CCA on a corresponding medium at a corresponding transmission time is lower than a CCA threshold.

However, since a CCA procedure for UL transmission in the subframe n may be completed before the subframe n starts (for example, completed within 20 us before the subframe n starts under the assumption that the CCA is performed in unit of 20 us), there is a high possibility that g a time for computing a power headroom is insufficient in the subframe n according to the CCA result.

When a UL transmission is scheduled, the wireless device may know a specific format of a UL signal to be transmitted at a corresponding time. According to an embodiment of the present invention, it is proposed that the wireless device computed the power headroom assuming that the scheduled UL transmission is performed even if the scheduled UL signal is not actually transmitted. If a PUSCH and/or a PUCCH are scheduled in a subframe n of a U-cell, a power headroom may be computed and reported irrespective of whether the PUSCH/PUCCH is actually transmitted according to a CCA result.

A power headroom report of the U-cell may be proposed as follows.

In a first embodiment, the wireless device may calculate a maximum transmit power and a power headroom under the assumption that PUSCH transmission and/or PUCCH transmission are not present in the U-cell.

In a second embodiment, the wireless device may calculate the maximum transmit power and the power headroom under the assumption that the PUSCH transmission and/or the PUCCH transmission in the U-cell conform to a virtual format irrespective of an actual scheduled format.

In a third embodiment, the wireless device may calculate the maximum transmit power and the power headroom under the assumption that the PUSCH transmission and/or the PUCCH transmission in the U-cell are achieved according to a scheduled format irrespective of whether transmission is actually achieved.

In a fourth embodiment, the wireless device may report the power headroom in a subframe n+q (where q is integer, q>1) subsequent to the subframe n in which the PUSCH transmission and/or the PUCCH transmission are scheduled. Since the BS needs to know in which subframe the wireless device reports the power headroom on the basis of UL transmission scheduled in any subframe, the wireless device may report information regarding the subframe n, in which the power headroom is calculated, together with a PHR. The value q may be predetermined. Optionally, the wireless device may calculate a power headroom regarding a subframe in which UL scheduling is finally achieved before the subframe n+q in which the PHR is reported or a subframe in which PUSCH/PUSCH transmission is performed finally.

The first to fourth embodiments may be applied to the type-1 PHR and/or the type-2 PHR. The first to fourth embodiments may be applied when there is not enough time to calculate a PHR and/or to handle encoding after the wireless device determines whether PUSCH/PUCCH transmission is achieved in the U-cell.

The PHR according to the present embodiment may be applied together with a transmit power control of the aforementioned variable band signal and fixed band signal.

Figure 5:
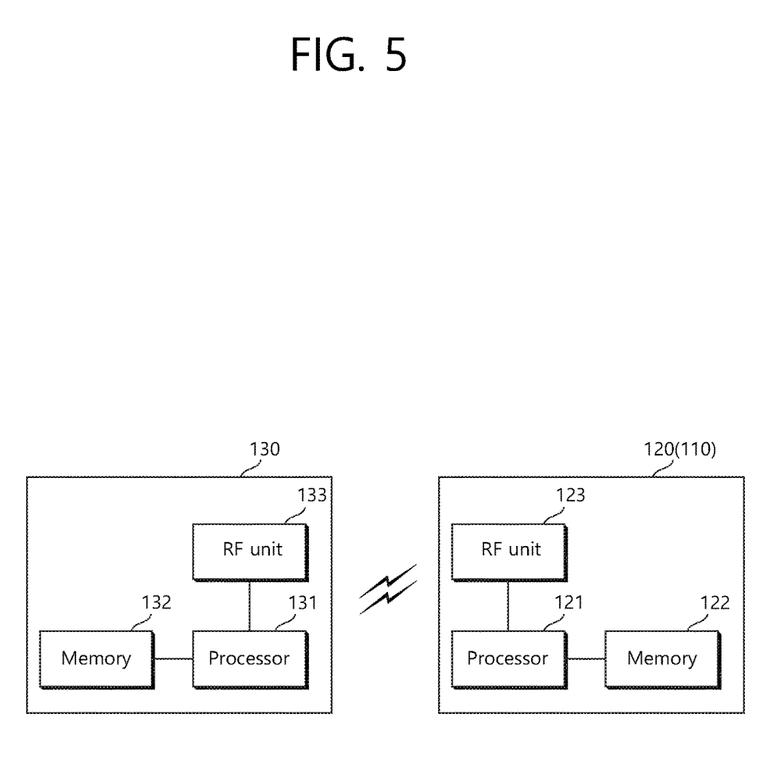
FIG. 5 is a block diagram showing a wireless communication system according to an embodiment of the present invention.

FIG. 5 is a block diagram showing a wireless communication system according to an embodiment of the present invention.

A wireless device 130 includes a processor 131, a memory 132, and a radio frequency (RF) unit 133. The memory 132 is coupled to the processor 131, and stores various instructions executed by the processor 131. The RF unit 133 is coupled to the processor 131, and transmits and/or receives a radio signal. The processor 131 implements the proposed functions, procedures, and/or methods. In the aforementioned embodiment, an operation of the wireless device may be implemented by the processor 131. When the aforementioned embodiment is implemented with a software instruction, the instruction may be stored in the memory 132, and may be executed by the processor 131 to perform the aforementioned operation.

ABS 120 includes a processor 121, a memory 122, and an RF unit 123. The BS 120 may operate in an unlicensed band. Alternatively, the BS 120 may play a role of the 1$^{st}$ BS 110 of FIG. 1 to operate a primary cell. The memory 122 is coupled to the processor 121, and stores various instructions executed by the processor 121. The RF unit 123 is coupled to the processor 121, and transmits and/or receives a radio signal. The processor 121 implements the proposed functions, procedures, and/or methods. In the aforementioned embodiment, an operation of the BS 110 or the BS 120 may be implemented by the processor 121.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for a wireless communication system, the method performed by a user equipment (UE) comprising:
   receiving scheduling information to schedule a physical uplink shared channel (PUSCH) transmission on a Licensed-Assisted Access (LAA) secondary cell operating in an unlicensed band;
   computing a power headroom for the LAA secondary cell based on the scheduling information;
   computing a maximum uplink transmit power for the PUSCH transmission; and
   reporting the power headroom for the LAA secondary cell,
   wherein the maximum uplink transmit power is computed assuming that the UE performs the PUSCH transmission on the LAA secondary cell irrespective of whether the UE can access the LAA secondary cell for the PUSCH transmission according to a channel access procedure.

2. The method of claim 1, wherein the power headroom for the LAA secondary cell is reported as a medium access control (MAC) control element (CE).

3. The method of claim 1, wherein the power headroom for the LAA secondary cell is computed based on a bandwidth used for the PUSCH transmission on the LAA secondary cell.

4. A device for a wireless communication system, the device comprising:
   a radio frequency (RF) unit configured to receive and transmit radio signals; and
   a processor operatively coupled with the RF unit and configured to:
      control the RF unit to receive scheduling information to schedule a physical uplink shared channel (PUSCH) transmission on a Licensed-Assisted Access (LAA) secondary cell operating in an unlicensed band;
      compute a power headroom for the LAA secondary cell based on the scheduling information;
      compute a maximum uplink transmit power for the PUSCH transmission; and
      control the RF unit to report the power headroom for the LAA secondary cell,
      wherein the maximum uplink transmit power is computed assuming that the device performs the PUSCH transmission on the LAA secondary cell irrespective of whether the device can access the LAA secondary cell for the PUSCH transmission according to a channel access procedure.

5. The device of claim 4, wherein the power headroom for the LAA secondary cell is reported as a medium access control (MAC) control element (CE).

6. The device of claim 4, wherein the power headroom for the LAA secondary cell is computed based on a bandwidth used for the PUSCH transmission on the LAA secondary cell.

7. The method of claim 1, wherein the power headroom for the LAA secondary cell is determined irrespective of whether the UE can access the LAA secondary cell for the PUSCH transmission according to a channel access procedure.

8. The device of claim 4, wherein the power headroom for the LAA secondary cell is determined irrespective of whether the device can access the LAA secondary cell for the PUSCH transmission according to a channel access procedure.

* * * * *